United States Patent [19]
Buermann et al.

[11] Patent Number: 5,991,022
[45] Date of Patent: Apr. 27, 1999

[54] REFLECTANCE SPECTROPHOTOMETRIC APPARATUS WITH TOROIDAL MIRRORS

[75] Inventors: Dale Buermann, Los Altos; Abdul Rahim Forouhi; Michael J. Mandella, both of Cupertino, all of Calif.

[73] Assignee: n&k Technology, Inc., Santa Clara, Calif.

[21] Appl. No.: 09/079,875

[22] Filed: May 15, 1998

Related U.S. Application Data

[63] Continuation-in-part of application No. 08/987,907, Dec. 9, 1997.

[51] Int. Cl.[6] .................................. G01J 3/02; G01J 3/42
[52] U.S. Cl. .................... 356/319; 356/446; 250/339.07; 250/339.11
[58] Field of Search ........................ 356/319, 323, 356/325, 326, 328, 445, 446; 250/339.07, 339.08, 339.11

[56] References Cited

U.S. PATENT DOCUMENTS

| | | | |
|---|---|---|---|
| 3,591,287 | 7/1971 | Hannis | 356/244 |
| 4,784,487 | 11/1988 | Hopkins | 356/326 |
| 5,045,704 | 9/1991 | Coates | 250/372 |

*Primary Examiner*—F. L. Evans
*Attorney, Agent, or Firm*—Lumen Intellectual Property Services

[57] ABSTRACT

An apparatus uses reflectance spectrophotometry to characterize a sample having any number of thin films. The apparatus uses two toroidal mirrors in an optical relay to direct light reflected by the sample to a spectrophotometer. A computer then analyzes the reflected spectrum to characterize the optical properties of the sample. The optical relay allows a range of angles of reflection from the sample, and has no chromatic aberration. The optical relay is also arranged so that the non-chromatic aberration is minimized. The sample is mounted on a movable stage so that different areas of the sample may be characterized. Furthermore, a deflector and a viewer are used to allow the operator of the apparatus to view the region of the sample under study.

26 Claims, 8 Drawing Sheets

(Prior Art)

REFLECTANCE SPECTROPHOTOMETRIC APPARATUS WITH TOROIDAL MIRRORS

RELATED APPLICATION DATA

This application is a continuation-in-part of application Ser. No. 08/987,907, filed on Dec. 9, 1997, which is herein incorporated by reference.

FIELD OF THE INVENTION

The present invention generally relates to the characterization of optical properties of materials and the determination of the thickness and optical constants n and k of thin films, and in particular to an apparatus without chromatic aberration that uses reflectance spectrophotometry to characterize thin films.

BACKGROUND

Recent advances in thin film technology have made it increasingly important to accurately measure the characteristics of thin films. The thin film properties of interest include:

Thickness, d

Index of Refraction, n

Extinction Coefficient, k

Energy Bandgap, $E_g$

Interface Roughness, $\sigma$

The index of refraction n and the extinction coefficient k depend on the energy E of the photons involved; i.e., $n=n(E)$ and $k=k(E)$. The index of refraction $n(E)$ describes how light is diffracted by a material. In similar materials, $n(E)$ scales with the density of the material. The extinction coefficient, $k(E)$, relates to the absorption of light. A material with a large extinction coefficient absorbs more light than a material with a small extinction coefficient. Transparent materials have an extinction coefficient of zero in the visible range of light. The energy bandgap, $E_g$, represents the minimum photon energy needed for a direct electronic transition from the valence to the conduction band; i.e., for $E<E_g$, absorption of light due to direct electronic transitions is zero.

In general, the determination of the above quantities is a non-trivial problem. The $n(E)$ and $k(E)$ spectra of a film cannot be measured directly, but must be deduced from optical measurements. U.S. Pat. No. 4,905,170 by Forouhi and Bloomer discloses a method for determining these spectra from the reflectance spectrum of the film. Their method involves shining light onto the film and observing how much light is reflected back. The reflectance spectrum, R(E), is defined as the ratio of the reflected intensity to the incident intensity of light. R(E) depends on the angle of incidence $\theta$ of the light upon the film, as well as the film thickness d, the indices of refraction and extinction coefficients $n_f(E)$ and $k_f(E)$ of the film, $n_s(E)$ and $k_s(E)$ of the substrate, the band gap energy of the film $E_g$, and the interface roughness $\sigma_1$ and $\sigma_2$ of both the top and the bottom of the film. To characterize any film, it is necessary to de-convolute the optical measurement R(E) into its intrinsic components d, $n_f(E)$, $k_f(E)$, $n_s(E)$, $k_s(E)$, $E_g$, $\sigma_1$ and $\sigma_2$.

The above patent by Forouhi and Bloomer incorporates a formulation for the optical constants $n(E)$ and $k(E)$, along with a parameterized model for interface roughness, into the Fresnel coefficients associated with films on a substrate to generate an algorithm that describes the theoretical reflectance; i.e., $$R_{theory}=R_{theory}(E, \theta, d, n_f(E), k_f(E), n_s(E), k_s(E), E_g, \sigma_1, \sigma_2)$$

By comparing the resultant equation for theoretical reflectance with the actual measurement of broad-band reflectance, the required parameters for thin film characterization d, $n_f(E)$, $k_f(E)$, $E_g$, and $\sigma_1$ and $\sigma_2$ can be determined.

To measure the reflectance R(E), light must be generated by a source and reflected by the sample into a spectrophotometer. Typically, lenses are used to build optical relays that direct the light from the source to the sample, and from the sample to the spectrophotometer. (An optical relay is a device that produces an image at one point from a source at another point.) The many different materials used in the fabrication of coatings have characteristic reflectance peaks that range from the ultraviolet to the infrared. Therefore, the reflectance spectrum of the sample should be measured for wavelengths in the range from about 190 nm to 1100 nm. Unfortunately, over this wide range of wavelengths, simple lenses exhibit a significant amount of chromatic aberration: the focal length typically changes by about 20% from one end of the spectrum to the other. Therefore any optical relay using lenses will be more efficient at some wavelengths than at others. This means that the measured spectrum will be distorted.

U.S. Pat. No. 4,784,487 by Hopkins and Willis describes an optical relay for spectrophotometric measurements that partially compensates for this chromatic aberration by a skillful use of apertures. There are two difficulties with this relay in the present context. First, the relay was developed for transmittance rather than reflectance measurements. Even if the relay is adapted for reflectance measurements, however, it will still be extremely sensitive to small misalignments. This is because when the light beam reflected by the sample is focused onto the entrance slit of the spectrophotometer, the pencil of light entering the spectrophotometer is not chromatically homogeneous, but is, for example, red in the center and blue toward the edges. If a misalignment occurs, the input beam is no longer exactly centered on the entrance slit, and not only does the intensity of measured light decrease, but the relative ratio of blue to red changes. This is disastrous to the above method of characterizing thin films, since the method relies on measuring all parts of the reflected spectrum equally well. Small and unavoidable misalignments therefore lead to incorrect characterizations of the thin film.

Figure 1:
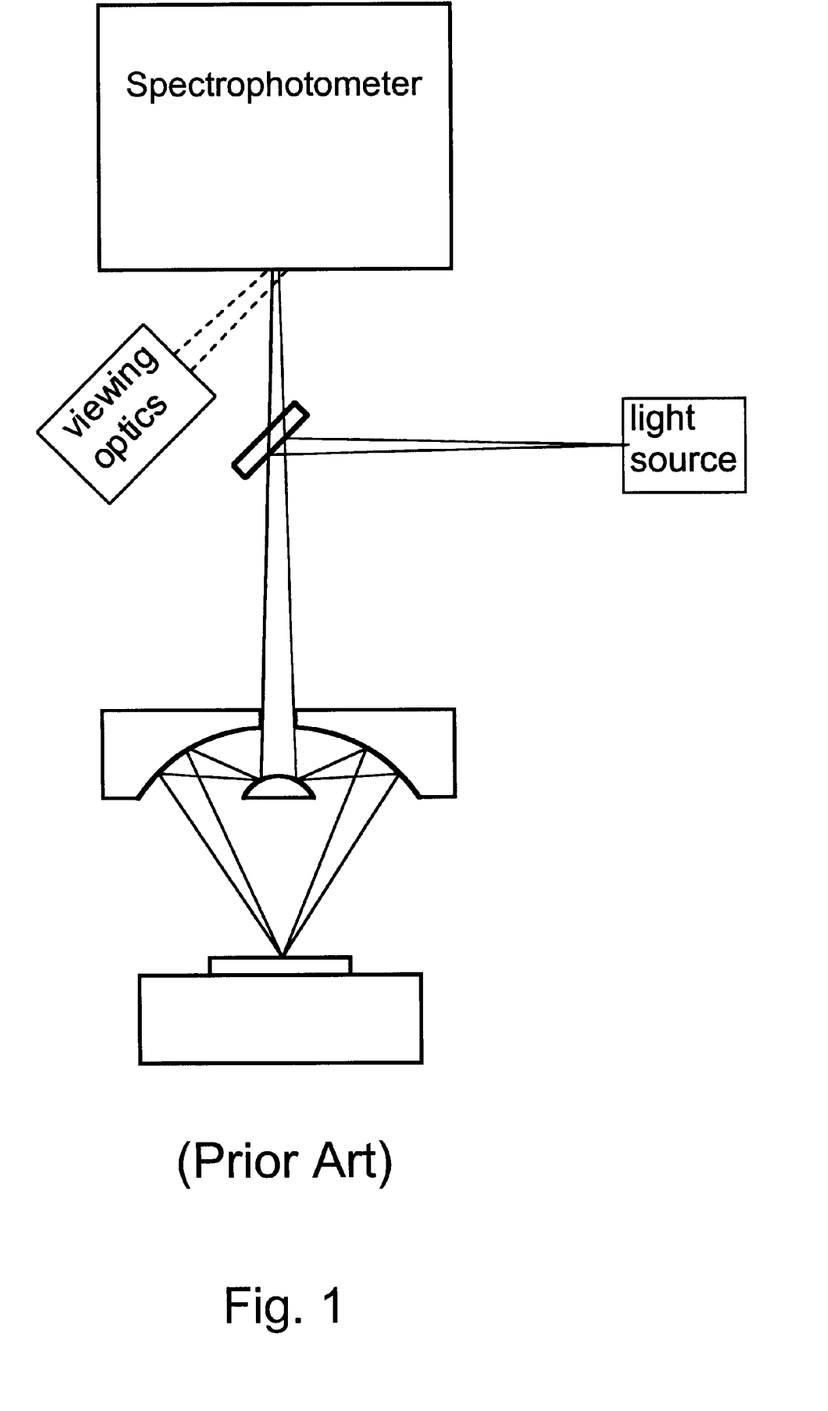
FIG. 1 shows a prior art spectrophotometric apparatus.

FIG. 1 shows a prior art apparatus for determining the reflectance R(E) of a material. The apparatus is described in U.S. Pat. No. 5,045,704 by Coates and in literature available from Nanometrics Incorporated of Sunnyvale, Calif. This apparatus does not suffer from chromatic aberrations because it uses mirrors rather than lenses to direct light from the source to the sample and from the sample to a spectrophotometer. However, the apparatus has a number of weaknesses. The apparatus uses a beam splitter, so the intensity of the light entering the spectrophotometer is roughly one fourth of the intensity that could be attained by an apparatus with no beam splitter. Furthermore, it is difficult to obtain a beam splitter that works efficiently throughout the wavelength range required.

In the apparatus of FIG. 1, viewing optics are included so that one may visually examine the area of the thin film being measured. However, the image viewed is an image projected upon the surface surrounding the entrance aperture of the spectrophotometer. The image is on the order of 500 microns in diameter, and on this scale most surfaces are noticeably rough. Therefore the image has a grainy appearance.

Furthermore, when using the apparatus of FIG. 1, it is difficult to vary the angles of reflection of light from the sample that are received by the spectrophotometer. At an angle of reflection near 0°, the equations for the reflectance R are simpler than at larger angles, and the calculations of optical properties are therefore easier. If the reflectance R is measured at several different angles, however, more information is gained for analysis. It is therefore desirable to use an optical relay that allows for a range of angles of reflection, this range being adjusted to optimize the information obtained for the thin film analysis.

In an apparatus used to characterize a material using reflectance spectrophotometry, it is desirable that light reflected from the material is directed into a spectrophotometer by an optical relay that has a minimum of aberrations. First, as discussed above, it is crucial to eliminate the chromatic aberrations to achieve an accurate measurement. However, lenses and mirrors have other, nonchromatic aberrations as well. These aberrations include spherical aberration, coma, astigmatism, curvature of field, and distortion. All lenses and mirrors suffer from these aberrations to some extent, even if they are perfectly machined. The existence of these aberrations represents a fundamental limitation on the nature of a lens or mirror—a limitation that is generally neglected in the paraxial approximation of introductory texts. Since the thin films of interest often include patterns, such as integrated circuits, it is desirable that a reflectance spectrophotometric apparatus be able to image a small area, on the order of 50 microns in diameter, of the thin film to a spectrophotometer with as little aberration as possible. It is also desirable that the apparatus include hardware for translating the film with respect to the imaging optics so that different regions of the film may be characterized.

OBJECTS AND ADVANTAGES

Therefore the preferred objects of the present invention are to provide an apparatus for characterizing a thin film sample using reflectance spectrophotometry such that:

a) the apparatus is free from chromatic aberration;

b) the apparatus has a minimum of non-chromatic aberration;

c) the apparatus has as few components as possible;

d) the apparatus is capable of displaying a clear image of the portion of the sample under investigation;

e) the apparatus includes hardware for moving the sample with respect to the imaging optics; and f) the apparatus allows for light with an adjustable range of angles of reflection to be collected from the sample.

These objects yield a reflectance spectrophotometric apparatus with the following advantages:

a) the apparatus is equally accurate at all wavelengths and is insensitive to small changes in alignment;

b) the apparatus can be used to make reflectance measurements on localized regions of the sample with a high degree of spatial accuracy;

c) the spurious loss of light in the apparatus is minimized;

d) the operator of the apparatus can easily determine which region of the sample is being probed;

e) different areas of the sample may be probed; and f) the angles of reflection of light from the sample may be chosen to optimize subsequent analysis of the sample.

SUMMARY

An apparatus is used for characterizing optical properties of materials and for determining the thickness and optical constants n and k of thin films. The apparatus comprises a light source that generates a broadband optical beam, optics positioned to image the light source on a sample to be analyzed, and an optical relay to collect light reflected from a measurement area of the sample and to deliver the light to a spectrophotometer. The light that enters the spectrophotometer is converted to digital data and output to a computer for analysis.

The optical relay comprises two toroidal mirrors positioned symmetrically. Because the optical relay uses mirrors, the relay has no chromatic aberration; because of the symmetric placement of the toroidal mirrors, non-chromatic aberrations are largely canceled.

The apparatus is equipped with a deflector, preferably a movable deflector, that may be positioned to project an image of the measurement area of the sample to a viewer, preferably a CCD camera. When the apparatus is used to make spectrophotometric measurements, the deflector may be moved out of the path of the light reflected from the measurement area. Therefore, the apparatus does not suffer from spurious loss of light.

The sample is removably attached to a sample holder that comprises a movable stage. The movable stage allows the sample to be translated with respect to the optical relay, thereby allowing different regions of the sample to be probed. Furthermore, by altering the size and positions of the toroidal mirrors of the optical relay, light with any desired range of angles of reflection from the sample may be received by the spectrophotometer.

DETAILED DESCRIPTION

Figures 2A, 2B:
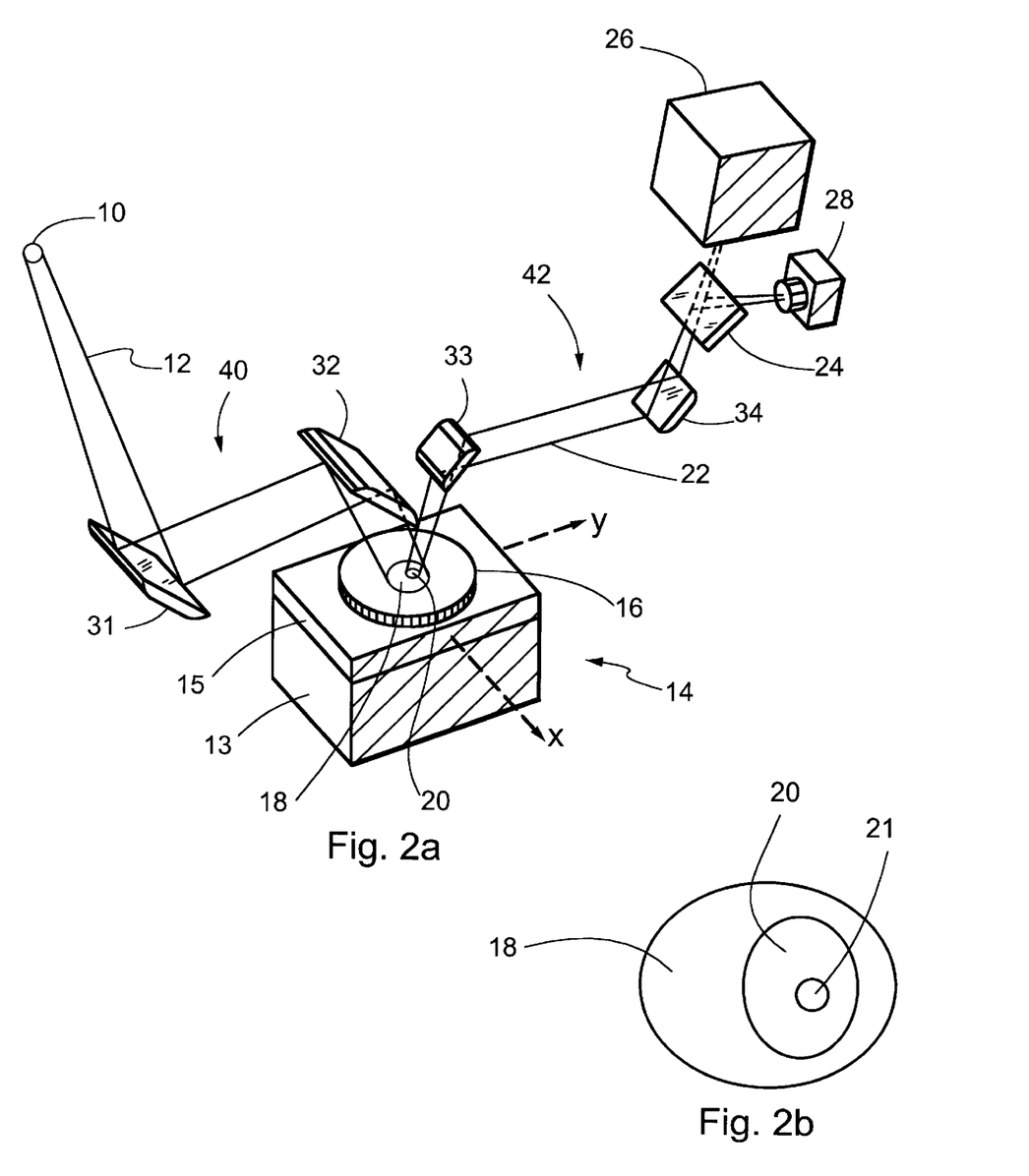
FIG. 2a shows a three-dimensional view of the preferred embodiment of the apparatus.
FIG. 2b shows a close-up view of an illuminated area, a viewing area, and a measurement area of a sample.

FIG. 2a shows the preferred embodiment of the apparatus. A light source 10 emits a broadband optical beam 12. Beam 12 has a broad spectrum, and preferably has wavelengths lying in the range between 190 nm and 1100 nm. Beam 12 is reflected and collimated by a first toroidal mirror 31. Beam 12 is then reflected and focused by a second toroidal mirror 32. Beam 12 strikes an illuminated area 18 of a sample 16.

Sample 16 preferably comprises a substrate and at least one thin film deposited onto the substrate. Mirrors 31 and 32 together form a first optical relay 40 for imaging source 10 onto sample 16.

In the preferred embodiment, a viewing area 20 is contained within illuminated area 18. Viewing area 20 is preferably on the order of 500 microns or less in diameter. As shown in FIG. 2b, viewing area 20 contains a measurement area 21. Measurement area 21 is preferably on the order of 50 microns or less in diameter. In the preferred embodiment, illuminated area 18 is at least as large as viewing area 20, and can be as large as the entire area of sample 16. In an alternative embodiment, illuminated area 18 is as small as measurement area 21, and in another embodiment, illuminated area 18 is smaller than measurement area 21.

Referring again to FIG. 2a, light from source 10 reflected by viewing area 20 forms a reflected beam 22. Reflected beam 22 is collected and collimated by a third toroidal mirror 33. A fourth toroidal mirror 34 then receives beam 22. Beam 22 is reflected and focused by mirror 34. In FIG. 2a, beam 22 is reflected by a deflector 24 and subsequently enters a viewer 28. Viewer 28 receives an image of viewing area 20 and displays an enlarged image of viewing area 20. In the preferred embodiment, viewer 28 is a charge-coupled device (CCD) camera. Deflector 24 is a mirror that may be moved into and out of the path of beam 22. In the preferred embodiment, deflector 24 is attached to a conventional scanning motor, not shown, so that deflector 24 can be reproducibly moved. In an alternative embodiment, deflector 24 is a beam splitter.

Figure 3A:
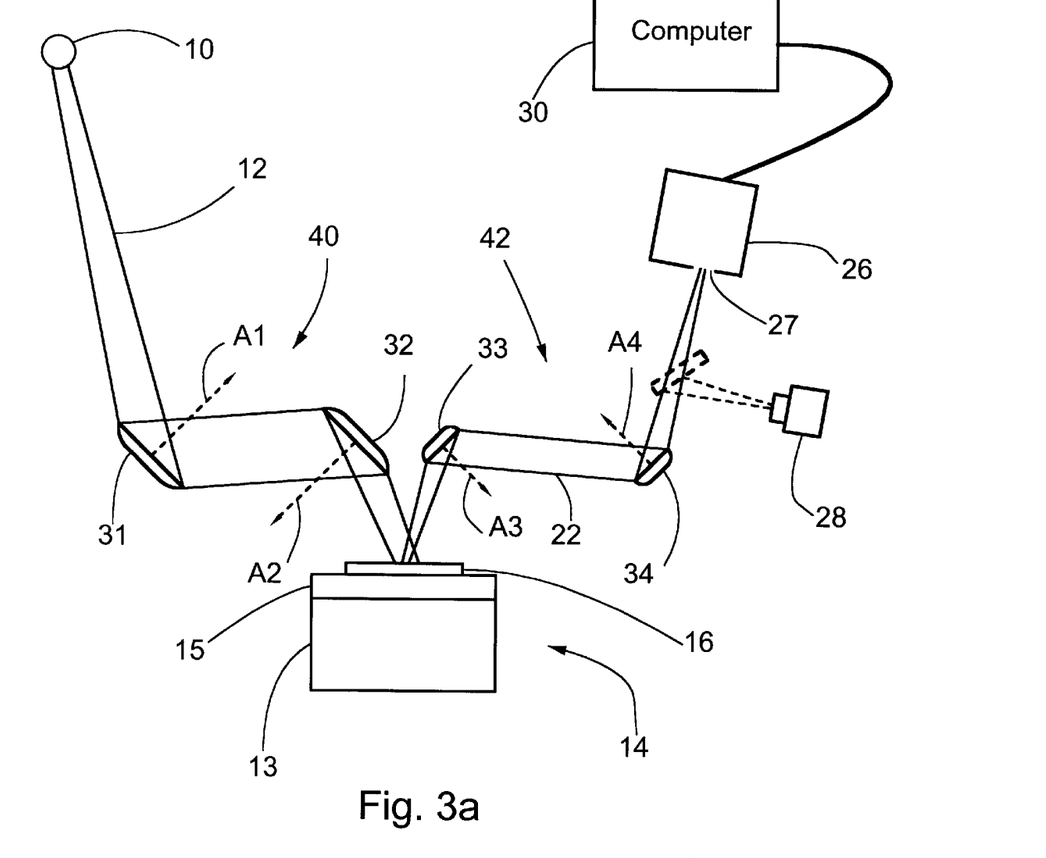
FIG. 3a is a two-dimensional view of the preferred embodiment of the apparatus.
Figure 3B:
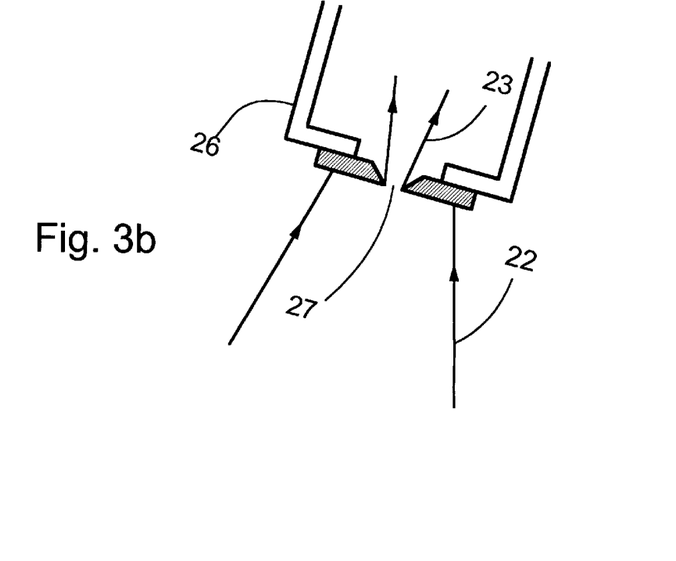
FIG. 3b is a close-up view of an entrance aperture of a spectrophotometer.

In FIG. 3a deflector 24 is moved out of the path of beam 22 so that beam 22 no longer enters viewer 28, but is focused on an entrance aperture 27 of a spectrophotometer 26. In the preferred embodiment, aperture 27 is small enough to partially block beam 22 as it enters spectrophotometer 26. In this embodiment, only light from measurement area 21 enters spectrophotometer 26. That is, measurement area 21 is imaged on aperture 27. The light entering spectrophotometer 26 forms a signal beam 23, as shown in FIG. 3b. Aperture 27 preferably has a diameter of approximately 50 microns. In alternative embodiments, aperture 27 has any desired size.

The spectrum of signal beam 23 is measured by spectrophotometer 26. Spectrophotometer 26 records the intensity of light at the different wavelengths present in signal beam 23, and the result is electronically transmitted to a computer 30. Computer 30 uses a program to compare the measured spectrum of signal beam 23 with a theoretical prediction of the same spectrum based on parameters that model the properties of sample 16. Computer 30 adjusts these parameters to fit the theoretical spectrum to the observed spectrum. Measurement area 21 is then characterized in terms of the parameters that best fit the observed reflected spectrum.

Sample 16 is removably attached to a sample holder 14. In the preferred embodiment, holder 14 comprises a movable stage 15 and a fixed stage 13. Sample 16 is attached to movable stage 15 of holder 14. Movable stage 14 allows sample 16 to be translated in an x and a y direction, as shown in FIG. 2a, with respect to mirror 33. This translation allows various regions of sample 16 to be probed. In the preferred embodiment, holder 14 is a conventional xy-stage. In an alternative embodiment, mirrors 33 and 34, deflector 24, viewer 28, and spectrophotometer 26 are mounted on a movable stage, and sample 16 is held fixed. In yet another embodiment, light source 10 is movable.

Mirrors 33 and 34 form a second optical relay 42 for directing light from viewing area 20 to aperture 27. Mirror 31 has an optical axis A1 normal to the center of mirror 31 and directed outward from the reflecting surface, as shown in FIG. 3a. Similarly, mirrors 32, 33, and 34 have optical axes A2, A3, and A4, respectively.

Figure 4:
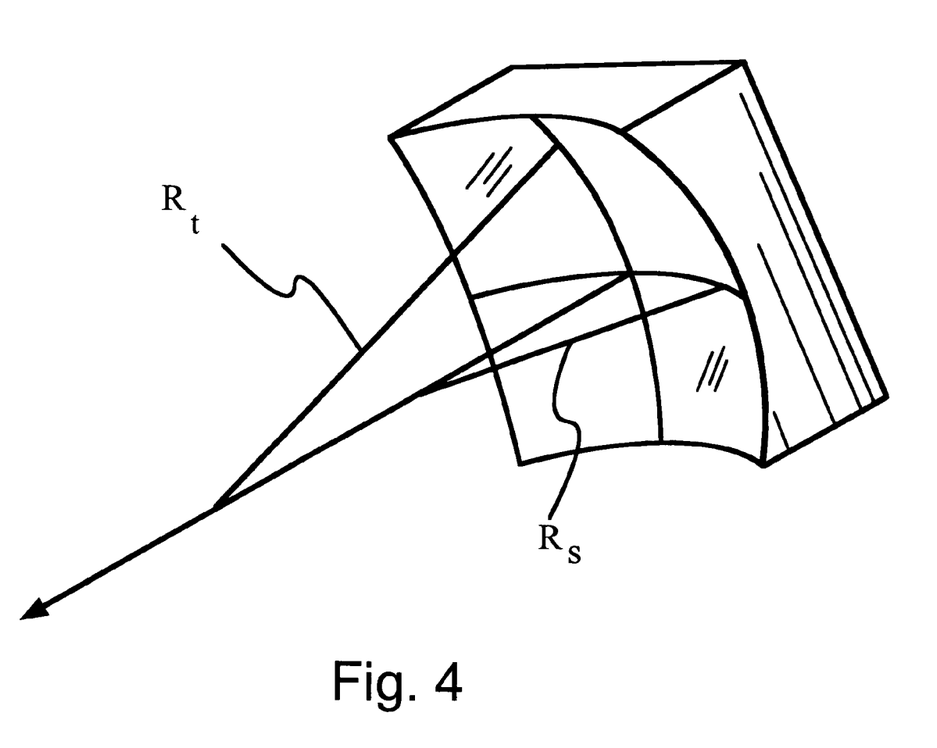
FIG. 4 is a three-dimensional view of a generic toroidal mirror.

Mirrors 31, 32, 33 and 34 are toroidal mirrors, meaning that each mirror has two different radii of curvature. The plane containing beams 12 and 22 is called the tangential plane. The plane orthogonal to the tangential plane that contains optical axis A1 is the sagittal plane of mirror 31. Similarly, mirrors 32, 33, and 34 each has its own sagittal plane. FIG. 4 shows a generic toroidal mirror having two radii of curvature: a radius of curvature in the tangential plane, $R_t$, and a radius of curvature in the sagittal plane, $R_s$.

Figure 5:
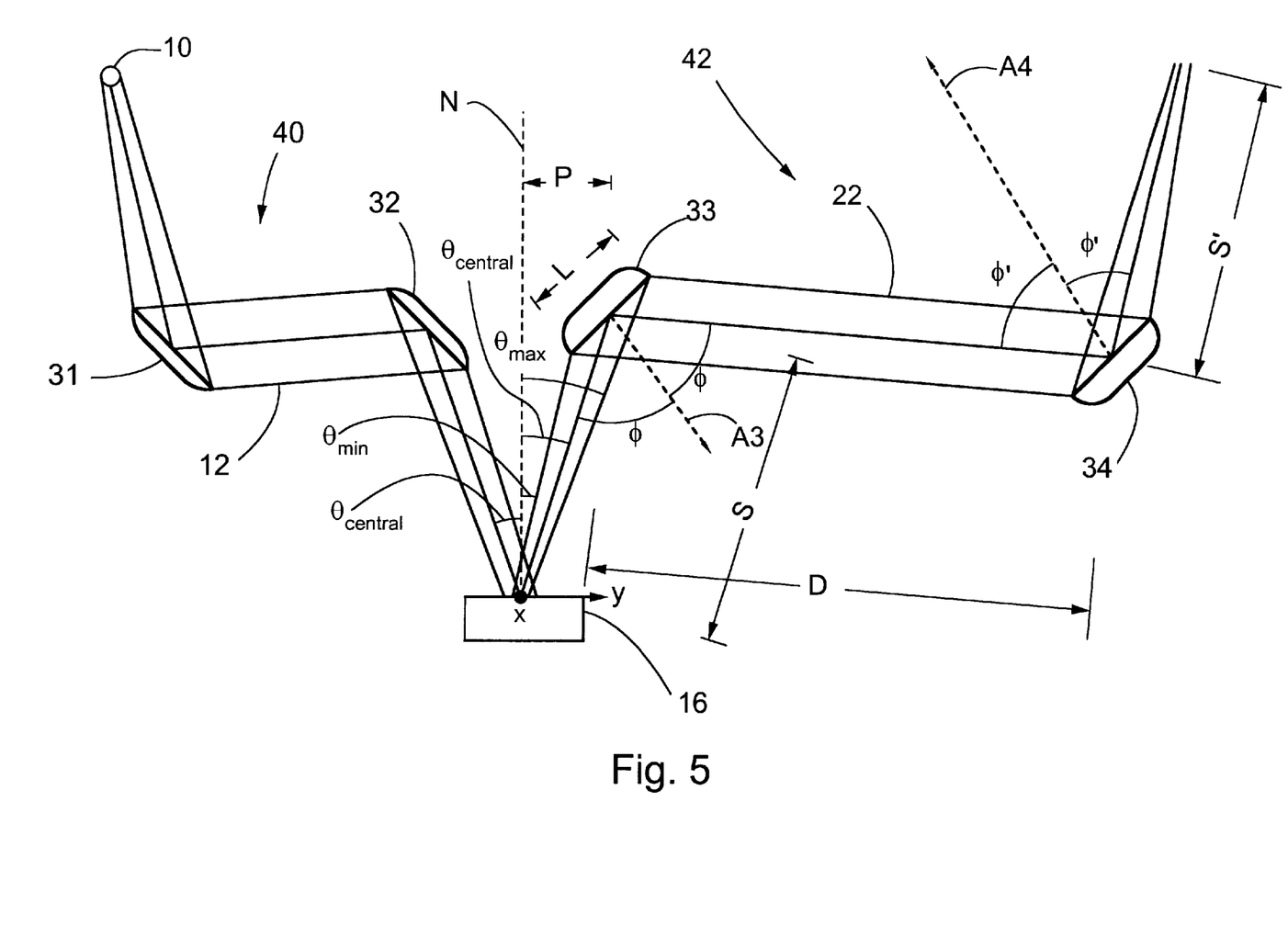
FIG. 5 shows first and second optical relays according to the preferred embodiment of the apparatus.

FIG. 5 shows a detail of optical relays 40 and 42. Beam 12 strikes sample 16 with a central angle of incidence of $\theta_{central}$ measured with respect to a normal N to sample 16. In the preferred embodiment, optical relay 40 comprises toroidal mirrors 31 and 32. In an alternative embodiment, optical relay 40 comprises a single toroidal mirror. In other embodiments, optical relay 40 comprises any standard optics, such as an optical fiber and a lens, to image light source 10 on sample 16. In all of these embodiments, light from source 10 strikes sample 16 with an average angle of incidence of $\theta_{central}$.

FIG. 5 shows the path of beam 22 as it leaves viewing area 20 and enters optical relay 42. Beam 22 has an angle of incidence of $\phi$ upon mirror 33. The ratio of the sagittal to the tangential radius of curvature, $R_s/R_t$, for mirror 33 is given by:

$$\cos \phi = (R_s/R_t)^{1/2}.$$

Beam 22 has an angle of incidence $\phi'$ upon mirror 34. The sagittal and tangential radii of curvature $R_s'$ and $R_t'$ of mirror 34 are related by:

$$\cos \phi' = (R_s'/R_t')^{1/2}.$$

In the preferred embodiment, mirrors 33 and 34 are identical, and $\phi=\phi'=45°$. Therefore $R_s/R_t=R_s'/R_t'=1/2$. In this embodiment, optical axis A3 is anti-parallel to optical axis A4; that is, optical axes A3 and A4 are parallel and point in opposite directions. Beam 22 is a parallel beam between mirrors 33 and 34; in other words, mirror 33 creates an image at infinity.

As shown in FIG. 5, the center of beam 22 travels a distance s from sample 16 to the center of mirror 33. The sagittal radius of curvature of mirror 33 is given by:

$$2 \cos \phi/R_s = 1/s.$$

Similarly, beam 22 travels a distance s' from the center of mirror 34 to aperture 27. The sagittal radius of curvature of mirror 34 is therefore given by:

$$2 \cos \phi'/R_s' = 1/s'.$$

In the preferred embodiment, s=s' and $R_s=R_s'$.

In alternative embodiments, s s', and mirrors 33 and 34 are not identical. In one embodiment, measurement area 21 is magnified as it is imaged on aperture 27. In another embodiment, a reduced image of measurement area 21 is present at aperture 27.

Referring again to FIG. 5, beam 22 makes a range of angles with respect to normal N, the angles lying between $\theta_{min}$ and $\theta_{max}$. That is, mirror 33 receives reflected light from sample 16 with a range of angles of reflection, the angles ranging from $\theta_{min}$ to $\theta_{max}$. The average angle of reflection is $\theta_{central}$, where $\theta_{central}=(\theta_{max}+\theta_{min})/2$. Mirror 33 has a length L, and the center of mirror 33 has a lateral distance p from the center of viewing area 20. Mirror 34 is a distance D from mirror 33.

From FIG. 5 and elementary geometry, it is evident how L, p, and s may be adjusted to obtain any desired angles $\theta_{min}$ and $\theta_{max}$. In the preferred embodiment a $\theta_{max}$ of less than 10° is used to simplify subsequent analysis, since for such a small $\theta_{max}$, the reflectance at each angle between $\theta_{min}$ and $\theta_{max}$ is approximately the same. At a large angle $\theta_{max}$, one would have to take into account the fact that not all of beam 22 emerges from sample 16 at the same angle. Furthermore, for $\theta_{max} \leq 10°$, the reflectance is approximately independent of the polarization of beam 22. In alternative embodiments, a $\theta_{max} > 10°$ is used to gain more information about sample 16 than could be obtained from a measurement with $\theta_{max} \leq 10°$.

The sample numerical aperture (N.A.) may be defined as:

$$N.A._{sample} = \sin[(\theta_{max} - \theta_{min})/2]$$

This numerical aperture represents the spread of angles of the cone of rays emerging from sample 16 imaged by optical relay 42.

Because relay 42 comprises mirrors and no lenses, relay 42 is free from chromatic aberration. Furthermore, the symmetrical arrangement of mirrors 33 and 34 in the preferred embodiment of optical relay 42 allow mirror 34 to partially cancel the nonchromatic aberrations of mirror 33. The extent of the aberration that remains can be estimated from an idealized model. A numerical study was done with the following parameters for optical relay 42: $\theta_{central}=0°$, s=s'=53 mm, D=48.15 mm, $\phi=\phi'=45°$, $R_t=R_t'=150$ mm, $R_s=R_s'=75$ mm, and an f-number of optical relay 42 equal to 4. The f-number is related to N.A.$_{sample}$, for N.A.$_{sample}$ much less than 1, by $$f\text{-number} \approx 1/(2\ N.A._{sample})$$

Figure 6A:
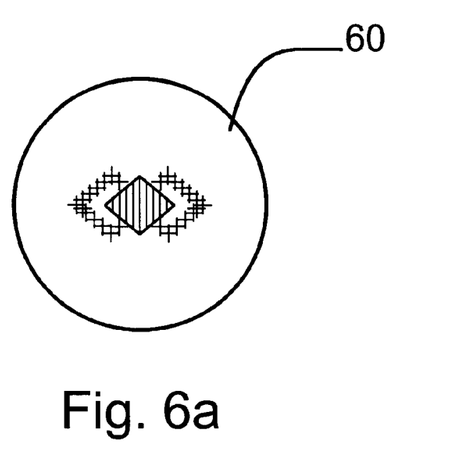
FIGS. 6a–6c are spot diagrams corresponding to the second optical relay of the preferred embodiment of the apparatus.

For the first numerical simulation, a single point at the center of measurement area 21 is imaged by optical relay 42. FIG. 6a shows a resultant spot diagram. Each cross of FIG. 6a represents a pencil of light arriving at aperture 27 via different points on mirror 33 and mirror 34. If no aberrations were present, only a single cross would appear at the center of FIG. 6a.

The spot diagram of FIG. 6a was generated mathematically using the laws of geometrical optics. However, the wave nature of light must also be taken into account. For reference, an Airy disk 60 is included in FIG. 6a. In a physical system, each cross of FIG. 6a is blurred out to approximately the size of Airy disk 60 due to diffraction effects. The diameter of Airy disk 60 depends on the wavelength of light involved, and is equal to (2.44)·$\lambda$·(f-number), where $\lambda$ is the wavelength of the light. For Airy disk 60, a wavelength of $\lambda$=550 nm was used.

Figure 6B:
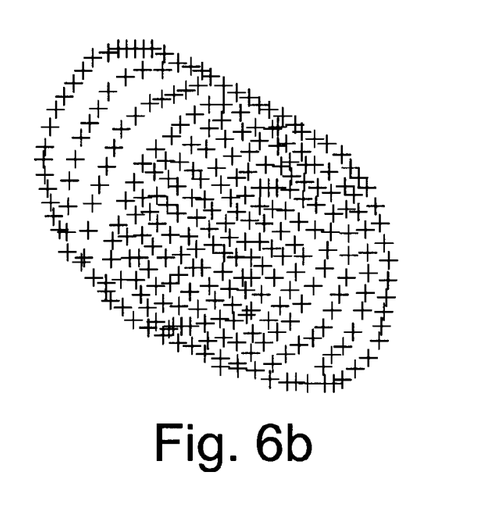
Figure 6C:
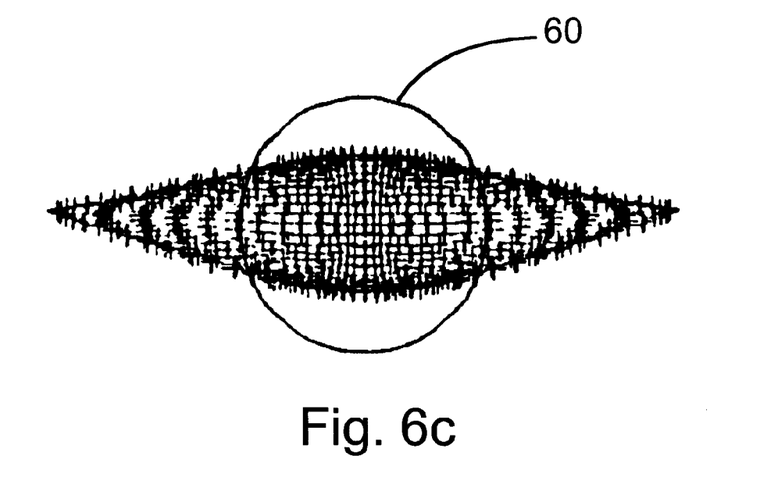

Coordinate axes are set up on sample 16 with the origin at the center of measurement area 21. The x-axis points out of the page of FIG. 5, the y-axis points to the right. See also FIG. 2 for the directions of the x- and y-axes. FIG. 6a results from a single point at x=y=0. FIGS. 6b and 6c show analogous spot diagrams for a point source at x=0, y=0.1 mm, and x=0.1 mm, y=0, respectively.

Figure 7:
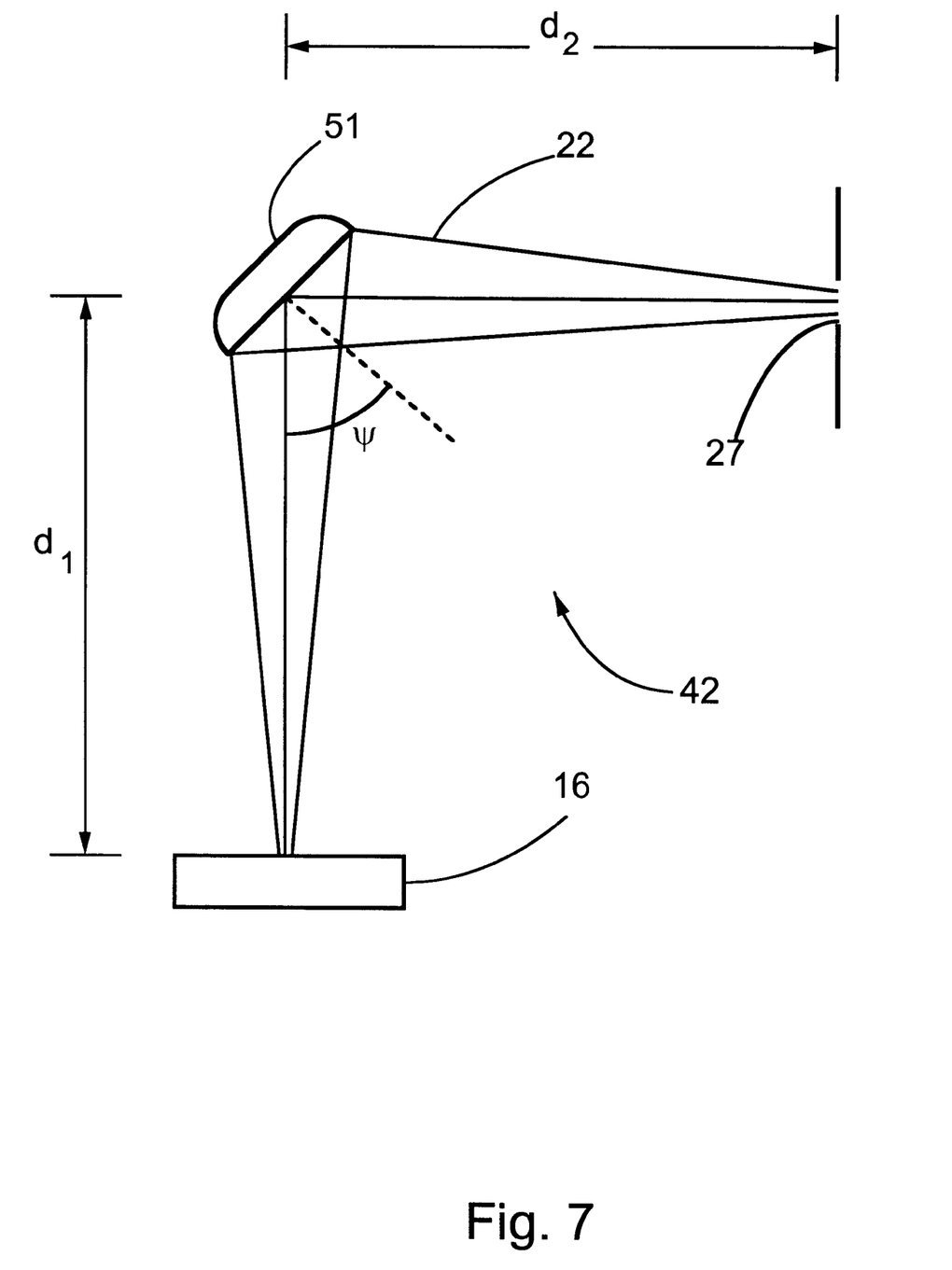
FIG. 7 is a detail of the second optical relay according to a second embodiment of the apparatus.

The aberrations of the preferred embodiment of optical relay 42 may be compared to the aberrations of a second embodiment of optical relay 42. FIG. 7 shows the second embodiment of optical relay 42, which comprises only one toroidal mirror 51. Beam 22 travels a distance $d_1$ from sample 16 to mirror 51 and a distance $d_2$ from mirror 51 to aperture 27. Beam 22 has an angle of incidence $\psi$ upon mirror 51.

For a numerical simulation of the aberrations of the second embodiment of FIG. 7, the following values were chosen: $d_1=d_2=106$ mm, $\psi=45°$, and an f-number equal to 4.

Figures 8A, 8B, 8C:
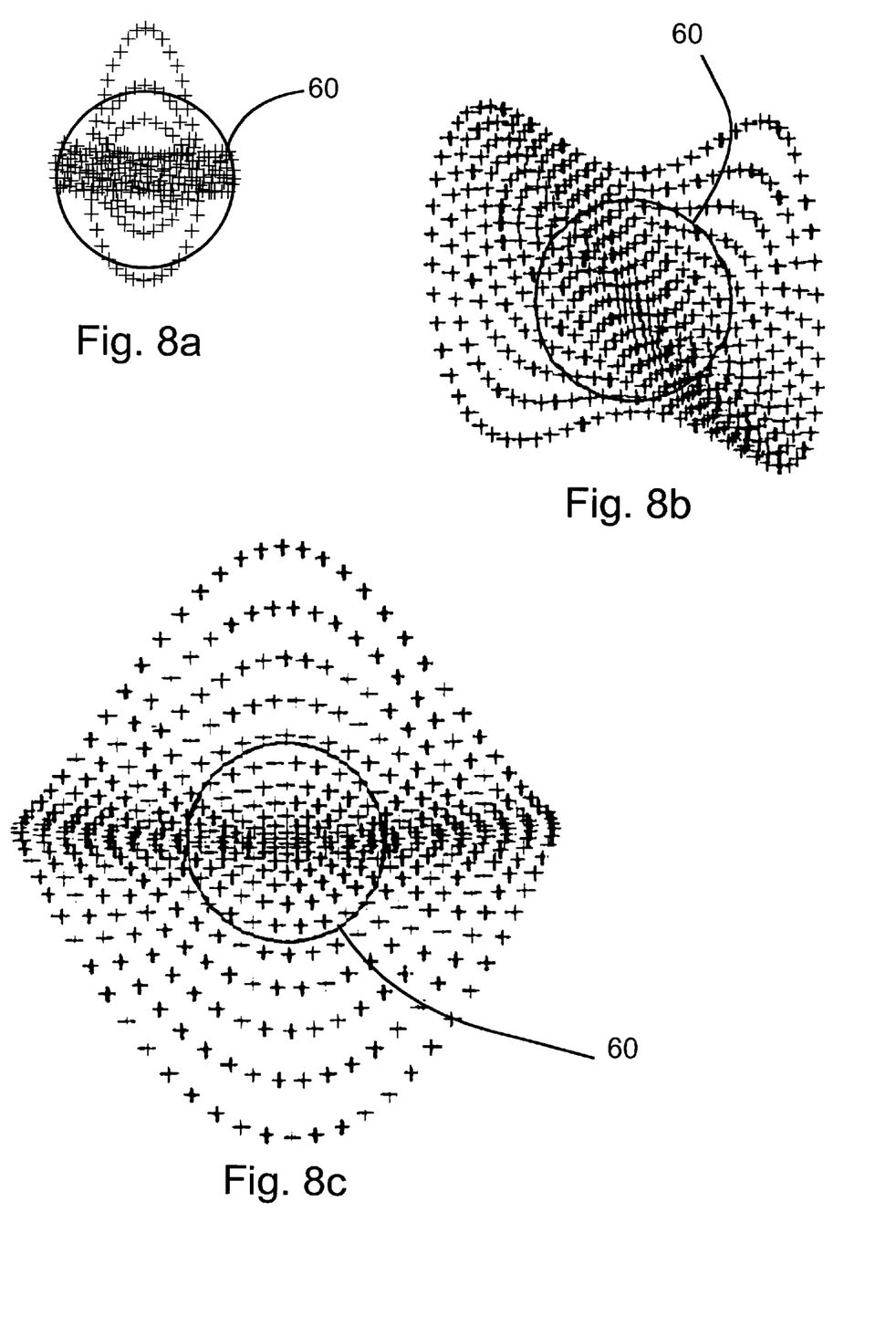
FIGS. 8a–8c are spot diagrams corresponding to the second optical relay of the second embodiment of the apparatus.

Furthermore, mirror 51 has a tangential radius of curvature equal to 150 mm, and a sagittal radius of curvature equal to 75 mm. FIG. 8a shows a spot diagram resulting from a point at x=y=0 on sample 16. FIGS. 8b and 8c show spot diagrams for x=0, y=0.1 mm, and x=0.1 mm, y=0, respectively. For reference, Airy disk 60 is also shown in FIGS. 8a–8c.

The spread of spots in FIGS. 8a–8c is considerably larger than the spread in FIGS. 6a–6c, respectively. Therefore the two-mirror arrangement of the preferred embodiment, FIG. 5, has less aberration than the single mirror arrangement of the second embodiment, FIG. 7. Evidently in the preferred embodiment, mirror 34 partially cancels some of the aberration caused by mirror 33.

The spectrum of light reflected by sample 16 enters spectrophotometer 26 as signal beam 23. It is well known in the art how to obtain a value for the absolute reflectance R(E) of sample 16 given the reflected spectrum gathered by spectrophotometer 26. Techniques include replacing sample 16 with a reference sample with a known reflectance, then comparing the reflected spectrum of the reference sample with the reflected spectrum of sample 16.

Data gathered by spectrophotometer 26 is output to computer 30. Computer 30 uses a computer program to compare the data with a theoretical model of the data. In the preferred embodiment, the computer program compares the measured absolute reflectance R(E) with a theoretical reflectance $R_{theory}(E)$. The theoretical model depends on an index of refraction n(E) and an extinction coefficient k(E) of sample 16, as well as on angles $\theta_{min}$ and $\theta_{max}$. By comparing the theoretical model with the data for different values of n(E) and k(E), the computer program determines the functions n(E) and k(E) that best describe sample 16.

In the preferred embodiment, sample 16 comprises at least one thin film, and the theoretical model depends on a thickness, an index of refraction, and an extinction coefficient of each film. The computer program determines the values of the thickness, the extinction coefficient, and the index of refraction of each film that best fit the data. In the following example, sample 16 has only one thin film and a substrate at measurement area 21.

Example: n(E) and k(E) refer to an index of refraction and an extinction coefficient, respectively, of the thin film. The theoretical reflectance $R_{theory}(E)$ depends on a thickness d of the thin film as well as an index of refraction and an extinction coefficient of the substrate, $n_s(E)$ and $k_s(E)$, respectively. Therefore $R_{theory}(E) = R_{theory}(E, \theta_{min}, \theta_{max}, d, n(E), k(E), n_s(E), k_s(E))$. $R_{theory}(E)$ may depend on other parameters, as well. When $\theta_{max} \leq 10°$, $R_{theory}(E)$ is expressed as follows. A complex index of refraction of the thin film N(E) is defined as N(E)=n(E)−ik(E). An analogous complex index of refraction is defined for the substrate, $N_s(E)$, as well as for the ambient medium through which beams 12 and 22 travel, $N_a(E)$. The preferred ambient medium is air. The theoretical reflectance, for $\theta_{max} \leq 10°$ and one thin film, is $$R_{theory}(E) = |(r_{12} + r_{23}e^{-i\delta})/(1 + r_{12}r_{23}e^{-i\delta})|^2$$

where $$r_{12} = [N(E) - N_a(d)]/[N(E) + N_a(E)]$$

$$r_{23} = [N_s(E) - N(E)]/[N_s(E) + N(E)]$$

and $$\delta = d(4\pi E/hc)N(E)$$

where h is Planck's constant and c is the speed of light. By comparing $R_{theory}(E)$ with R(E), the computer program determines the value of d, n(E), and k(E) that best describe the thin film. This concludes the example.

It is well known in the art how to compute $R_{theory}(E)$ for cases more complicated than the above example, such as when $\theta_{max} > 10°$, and when sample 16 comprises more than one thin film. Information on this subject is found in O. S. Heavens, *Optical Properties of Thin Solid Films* (Butterworth, London, 1955).

In the preferred embodiment, using well known techniques, the computer program also incorporates an interface roughness of each surface of each film of measurement area 21 into the calculation of $R_{theory}(E)$. By minimizing the difference between $R_{theory}(E)$ and $R(E)$, the interface roughnesses are thereby also determined.

The computer program uses mathematical parametrizations of n(E) and of k(E). Each parametrization preferably depends on at least three parameters A, B, and C, where A is a probability term related to the probability that an electron will undergo a transition from an initial to a final state in the sample, B is an energy term related to the difference between the initial and final energies of an electron in the sample, and C is a lifetime term related to the time that an electron in the sample will remain in the final state. For example, for an amorphous material the extinction coefficient k(E) may be parametrized as:

$$k(E) = A(E-E_g)^2/(E^2-BE+C)$$

where $E_g$ is a bandgap energy of sample 16. Many other parametrizations for different materials are known in the art and are discussed, for example, in U.S. Pat. No. 4,905,170 by Forouhi and Bloomer. The computer program uses the parametrization or parametrizations most suited to the materials that compose sample 16. The index of refraction n(E) can be determined from k(E) using the well known dispersion relations.

Using the parametrizations of n(E) and k(E), the computer program uses any standard curve-fitting routine to find the parameters that best describe the data. It will be clear to one practiced in the art how to generalize the above discussion to include a plurality of thin films. The computer program is therefore easily used to determine the index of refraction, the extinction coefficient, and thickness of each film present at measurement area 21. In one embodiment, measurement area 21 has no thin films; in this case, the computer program determines an index of refraction and an extinction coefficient of the material present at measurement area 21.

For the accurate determination of the optical properties of sample 16, it is important that source 10 emit a broadband beam (a beam containing a wide spectrum of light). Because relay 42 contains no components with chromatic aberration, each part of the spectrum of beam 22 is focused equally onto aperture 27. Therefore if there is a slight misalignment of mirror 33 or mirror 34, beam 22 may walk across aperture 27, causing a change in overall measured intensity, but the measured relative intensities of the different wavelengths of the spectrum will remain unchanged.

Furthermore, because mirror 34 partially cancels the aberrations of mirror 33, viewing area 20 and measurement area 21 are both accurately imaged by optical relay 42. This precise imaging permits measurements to be made on samples that comprise a pattern of different thin films, where measurements are desired only on small areas in predetermined locations. Measurement area 21 can be made to coincide with any predetermined location on sample 16 by using viewer 28 and controlling the position of movable stage 15.

We claim:

1. An apparatus for characterizing optical properties of a sample, the apparatus comprising:
   a) a light source for generating a broadband optical beam,
   b) optics positioned to image the light source on the sample, c) a first toroidal mirror positioned to collect light reflected by a measurement area of the sample, and d) a second toroidal mirror positioned to receive said light and to image the measurement area on an entrance aperture of a spectrophotometer.

2. The apparatus of claim 1 further comprising a computer in electronic communication with the spectrophotometer, wherein the computer runs a program which compares data output from the spectrophotometer with a theoretical model that depends on an index of refraction n(E) and an extinction coefficient k(E), whereby values of the index of refraction n(E) and of the extinction coefficient k(E) that best describe the sample are determined.

3. The apparatus of claim 2, wherein the computer program uses a mathematical parametrization of the extinction coefficient k(E), the parametrization comprising
   a) a probability term related to a probability that an electron transition will occur from an initial state to a final state in the sample,
   b) an energy term related to a difference in energy between the initial state and the final state in the sample, and
   c) a life-time term related to the life-time that electrons tend to remain in the final state in the sample.

4. The apparatus of claim 2, wherein the sample comprises a thin film and wherein the theoretical model additionally depends on a thickness of the thin film, whereby a value of the thickness that best describes the thin film is determined.

5. The apparatus of claim 1, further comprising a deflector positioned between the second toroidal mirror and the entrance aperture, for deflecting an image of the measurement area to a viewer.

6. The apparatus of claim 1, further comprising a holder for the sample, the holder comprising a movable stage for translating the sample with respect to the first toroidal mirror.

7. The apparatus of claim 1, wherein the broadband optical beam has wavelengths lying in a range between 190 nm and 1100 nm.

8. The apparatus of claim 1, wherein the light reflected by the measurement area of the sample has a plurality of angles of reflection from the sample, the angles lying in the range between 0 and 10 degrees.

9. The apparatus of claim 1, wherein the first and second toroidal mirrors have first and second optical axes, respectively, and wherein the first optical axis is substantially anti-parallel to the second optical axis.

10. The apparatus of claim 1, wherein the first toroidal mirror is substantially identical to the second toroidal mirror.

11. The apparatus of claim 1, wherein the first and second toroidal mirrors have first and second ratios of sagittal to tangential radius of curvature, respectively, and wherein the ratios are substantially equal to 1/2.

12. The apparatus of claim 1, wherein said sample comprises a thin film and said optical properties of said sample depends on a thickness of said thin film and a value (d) of said thickness that best describes said optical properties of said film is determined.

13. The apparatus of claim 2, wherein said sample comprises a thin film and said theoretical model further depends on a thickness of said thin film, whereby the value (d) that best describes said thickness of said sample is determined by said computer program.

14. An apparatus for characterizing optical properties of a sample using reflectance spectrophotometry, the apparatus comprising:
  a) a light source for generating a broadband optical beam,
  b) optics positioned to cause the broadband optical beam to strike the sample,
  c) a spectrophotometer having an entrance aperture, and
  d) an optical relay for collecting light reflected by a measurement area of the sample and for directing the light to the entrance aperture, the optical relay comprising first and second toroidal mirrors.

15. The apparatus of claim 14 further comprising:
  i) a computer in electronic communication with the spectrophotometer, and
  ii) a computer program that runs on the computer;
wherein the computer program compares data output from the spectrophotometer with a theoretical model that depends on an index of refraction n(E) and an extinction coefficient k(E), whereby values of the index of refraction n(E) and of the extinction coefficient k(E) that best describe the sample are determined.

16. The apparatus of claim 15, wherein the computer program uses a mathematical parametrization of the extinction coefficient k(E), the parametrization comprising
  a) a probability term related to a probability that an electron transition will occur from an initial state to a final state in the sample,
  b) an energy term related to a difference in energy between the initial state and the final state in the sample, and
  c) a life-time term related to the life-time that electrons tend to remain in the final state in the sample.

17. The apparatus of claim 15, wherein the sample comprises a thin film and wherein the theoretical reflectance additionally depends on a thickness of the thin film, whereby a value of the thickness that best describes the thin film is determined.

18. The apparatus of claim 14, further comprising a deflector and a viewer, the deflector being positioned to reflect an image of the measurement area to the viewer.

19. The apparatus of claim 14, further comprising a holder for the sample, the holder comprising a movable stage for translating the sample with respect to the optical relay.

20. The apparatus of claim 14, wherein the broadband optical beam has wavelengths lying in a range between 190 nm and 1100 nm.

21. The apparatus of claim 14, wherein the light reflected by the measurement area of the sample has a plurality of angles of reflection from the sample, the angles lying in the range between 0 and 10 degrees.

22. The apparatus of claim 14, wherein the first and second toroidal mirrors have first and second optical axes, respectively, and wherein the first optical axis is substantially anti-parallel to the second optical axis.

23. The apparatus of claim 14, wherein the first toroidal mirror is substantially identical to the second toroidal mirror.

24. The apparatus of claim 14, wherein the first and second toroidal mirrors have first and second ratios of sagittal to tangential radius of curvature, respectively, and wherein the ratios are substantially equal to 1/2.

25. The apparatus of claim 14, wherein said sample comprises a thin film and said optical properties of said sample depends on a thickness of said thin film and a value (d) of said thickness that best describes said optical properties of said film is determined.

26. The apparatus of claim 15, wherein said sample comprises a thin film and said theoretical model further depends on a thickness of said thin film, whereby the value (d) that best describes said thickness of said sample is determined by said computer program.

* * * * *